(12) United States Patent
Cresswell

(10) Patent No.: US 6,584,920 B1
(45) Date of Patent: Jul. 1, 2003

(54) SYSTEM AND METHOD FOR ADJUSTING AIR FLOW IN AIR SEEDING APPLICATIONS (75) Inventor: Mark Cresswell, St. Brieux (CA)

(73) Assignee: Bourgault Industries Ltd., St. Brieux (CA)

( * ) Notice: Subject to any disclaimer, the term of this patent is extended or adjusted under 35 U.S.C. 154(b) by 0 days.

(21) Appl. No.: 10/245,135

(22) Filed: Sep. 17, 2002

(51) Int. Cl.[7] .................................................. A01C 7/20
(52) U.S. Cl. .................... 111/174; 111/177; 111/200; 111/904; 701/50; 340/674; 340/684; 406/26
(58) Field of Search .................... 111/174, 177, 111/200, 903, 176, 170, 904; 701/50, 58; 340/684, 674, 673; 172/2–7; 406/197–26, 120

(56) References Cited

U.S. PATENT DOCUMENTS 5,924,371 A * 7/1999 Flamme et al. ............. 111/177
5,996,516 A * 12/1999 Benneweis et al. .......... 111/176
6,070,538 A * 6/2000 Flamme et al. ............. 111/170
6,192,813 B1 * 2/2001 Memory et al. ............. 111/173
6,296,425 B1 * 10/2001 Memory et al. ............. 406/197
2002/0150516 A1 * 10/2002 Pahlman et al. ............ 422/171
2002/0168302 A1 * 11/2002 Pahlman et al. ............ 422/171

* cited by examiner

Primary Examiner—Christopher J. Novosad
(74) Attorney, Agent, or Firm—Frost Brown Todd LLC

(57) ABSTRACT

A system for maintaining an appropriate air flow in an air stream in an air seeder. A fan provides an air stream to carry agricultural materials for distribution across a width of a seeding implement. A tank contains a granular agricultural material and a metering device dispenses the material into the air stream. The system is calibrated such that a known weight of material is dispensed for each revolution of the metering device whereby the rotational speed of the metering device multiplied by the known weight per revolution results in a known per minute rate of agricultural material being dispensed into the air stream. A microprocessor is programmed to derive an appropriate fan speed for the per minute rate of agricultural material being dispensed and send a signal to a fan control to adjust the speed of the fan to correspond to the appropriate fan speed.

20 Claims, 5 Drawing Sheets

SYSTEM AND METHOD FOR ADJUSTING AIR FLOW IN AIR SEEDING APPLICATIONS

This invention is in the field of air seeders and in particular addresses control of the air flow in the air streams in such seeders.

BACKGROUND OF THE INVENTION

In an air seeder, agricultural materials such as seed, fertilizer, and chemicals are dispensed from respective holding tanks into an air stream that carries the materials through a distribution network, typically a series of tubes and manifolds, to an array of seeding tools mounted along the width of an implement.

The rate of material being applied can vary greatly depending on the crop requirements. An air seeder may be required to apply as low as four or five lb/acre when seeding canola with no fertilizer, and up to 300 lb/acre or more when seeding wheat at high fertilizer rates. Where an air seeder is seeding 40 acres/hour, the air stream must carry about 3 lb/minute of material at the low rate and about 200 lb/minute at the higher rate. Much more air is required at the higher rate to carry the increased amount of material through the system.

It is preferred to have just enough air to carry the material to the furrow openers and maintain uniform distribution across the implement. Where excess air is present, the agricultural materials are traveling at higher speed than necessary when they exit the tube at the furrow opener. The faster the material is traveling when it exits the tube, the more it tends to bounce out of the furrow. Excess speed also can crack and damage seed. On the other hand, where insufficient air flow is present, the distribution across the implement can vary to an unsatisfactory degree. With insufficient air flow, the material being carried will begin to pulsate, and then material will begin to drop out of the air flow and gather at a spot in the distribution network and cause a blockage. Preferably the air flow is maintained at an appropriate level between insufficient and excessive.

Air seeders commonly have two or more tanks mounted on a cart, each tank carrying a particular agricultural material such as seed, fertilizer, chemical or the like. In a "single shoot" system, these materials are all metered into a single air stream and carried through a single distribution network such that a blend containing all the materials is deposited in a single furrow. In a "double shoot" system, two distinct and separate air streams and distribution networks are present. One or more materials are metered into each air stream and carried through a corresponding distribution network to be deposited in two separate furrows. Similarly "triple shoot" systems are also available providing three distinct and separate air streams and corresponding distribution networks, and increasing multiple systems are foreseeable.

The distinct air streams are typically provided in various ways. A single fan system includes dampers to divide and control the flow of air from the fan into separate air streams each flowing through a corresponding separate distribution network. This type of system is disclosed in U.S. Pat. Nos. 6,296,425 and 6,192,813 to Memory et al., and in 5,996,516 to Benneweis et al. In such a system the total volume of air is varied by varying the fan speed, and the proportion of the total volume directed to each separate air stream is controlled by the dampers. Where the fan speed is held constant, adjusting a damper to direct more air to one air stream will necessarily reduce the volume and speed of the other air streams. In the disclosed systems, a number of sensors monitor the speed of particles carried in the air stream, and the air flow in each air stream is automatically controlled by damper and fan speed adjustments that are made in response to particle speed variations.

Alternatively, a plurality of fans can each provide a separate air stream to each distribution network. The air flow in each air stream is then individually controlled by adjusting each fan speed, and the problem of cross-variation between air flows in separate streams is avoided. Alternatively again in a triple shoot system, a combination system can be provided where one of two fans provides air flow to one air stream, and the other of the two fans provides air flow to two other separate air streams, controlled by dampers.

In conventional seeding systems where the travel speed is substantially constant and where application rates remain constant, the amount of material per minute carried by each air stream, or the material flow rate, remains substantially constant. In such systems the air flow in each air stream can be conventionally adjusted with either manual or remotely controlled damper and fan speed adjusting mechanisms to an appropriate level, such that the air flow is not excessive and yet blockages are avoided. The required air flow also varies with humidity, temperature, and similar atmospheric conditions, as well as altitude. As well sharp slopes in a field can require a higher air flow than is required on flat fields. The material must be pushed uphill from the tank to certain portions of the implement as it moves through the field. Air flow requirements thus increase and decrease as these conditions vary, however the conventional adjustments have allowed for satisfactory operation in conventional fixed rate seeding operations.

Typically the metering devices are driven by a ground drive mechanism so that the amount of material per minute that is dispensed varies directly with ground speed so that the application rate is constant as speed varies. Typically the normal operating ground speed is the maximum speed that will be encountered and when the implement slows for corners and the like, the dispensing rate is reduced, and the air flow is somewhat excessive until normal operating ground speed is again achieved. Thus a conventional air seeder with a constant air flow set as required to carry the material dispensed at a normal ground speed will not experience blockages, since at times the air flow will be excessive, but at no time will the air flow be insufficient.

In practice it is not uncommon when application rates are increased or other conditions change for blockages to occur. The operator then clears the blocked runs manually and increases the air flow to avoid a recurrence. It is also not uncommon for the operator to maintain the higher air flow rate when conditions change again such that a reduced air flow is warranted. It is human nature to avoid blockages which must be manually cleared, and instead opt for excessive air flow which has no immediate consequences for the operator. Higher than necessary air flows are thus common in conventional air seeders.

Recent trends toward variable rate seeding have made air flow adjustment more problematic. In variable rate seeding, the application rate of each agricultural material can be varied by manual or automatic controls that vary the rate of material being dispensed by the metering devices as the machine travels along the field.

In a typical air seeder, the system is calibrated such that for each revolution of a metering device, typically a fluted roller or auger, a known quantity of the metered agricultural material is dispensed into an air stream for distribution across the width of the air seeder. Densities of agricultural materials vary considerably, and such calibration is necessary in order to determine the actual weight of the particular material that is being dispensed per revolution of the metering device.

In conventional seeding, this rotational speed varies only with the ground speed—the operator adjusts the ground drive mechanism to set the ratio between the rotational speed of the metering device and the rotational speed of the wheel on the ground such that the desired application rate results. For every turn of the ground wheel, the seeder will pass over a known area, and the metering device will rotate the required number of times to dispense the amount of agricultural material that is desired to be applied on that area. The desired application rate is thus applied to the field.

In variable rate seeding, this ratio between the rotational speed of the metering device and the rotational speed of the wheel on the ground, or ground speed, can be varied on the go, thus varying the application rate as the seeder moves along the field. The ratio can be varied by the operator manually in response to visual observations of field position, or can be varied automatically to apply rates in accordance with a programmed field map in response to location inputs from a global positioning system (GPS).

Rather than using conventional ground driven metering devices, some variable rate seeders instead drive the metering devices with a motor controlled by a microprocessor. The ground speed and desired application rate are read by the microprocessor which then computes the requisite rotational speed of the metering device and adjusts the speed of the motor to achieve it. As ground speed and application rate vary, the microprocessor continuously computes and adjusts the rotational speed of the metering device.

Where variable rate seeding is used, the amount of material carried by each air stream varies, often quite significantly. Air flow settings in each air stream are consequently conventionally set at that amount of air flow required to carry the amount of material per minute that is required to supply the maximum application rate that will be encountered in order to avoid blockages. The result is that on the majority of the field where the application rate is somewhat below the maximum rate, the air flow in each air stream will be excessive.

The above system of Memory et al. addresses this problem by monitoring the particle velocity in the air stream and making required adjustments to the air flow in each air stream. The Memory system reads the particle velocity in each run with the stated goal of maintaining the minimum particle velocity necessary to successfully carry the particles through the distribution network.

In the Memory et al. system it appears that an initial air flow rate based on product type and mass flow rate is established that is at least sufficient to carry the material through the distribution network, and the particle velocity in each run is then determined. An average or normalized particle velocity for all runs in a distribution network is determined, and the particle velocity in each run is compared to the average. The air flow is reduced incrementally, and if no run has a significantly lower particle velocity than average, it is reduced again, until one run slows down significantly relative to the average, whereupon the last decrease is reversed to avoid a predicted blockage in that run.

In operation, when particle velocity in one run slows down significantly compared to the average velocity of all the runs in a distribution network, the air flow is increased. Also periodically the air flow is reduced as above until one run slows down, whereupon the last decrease is reversed. Thus the minimum air flow is maintained as the implement moves through the field.

The system of Memory et al. is used in variable rate seeding operations. When the variable rate system sends a call over a communications bus for a change in rate the call is received by the metering system and by the air velocity control system. The velocity control system thus knows that more or less air flow will be required and so an initial adjustment to the air flow proportional to the increase or decrease in material flow rate is made by adjusting the fan speed and damper positions. Once this initial adjustment has been made, the air flow is further adjusted with the particle velocity sensing system.

The system of Memory et al. is complex and costly, since a typical double shoot air seeder will have a significant number of runs, each requiring a velocity sensor and connection to the microprocessor. The system appears to have had little, if any, commercial success to date. Presently this complex system is the only alternative to manually adjusting air flow.

A less costly and more simple solution to maintain appropriate air flow levels in conventional and variable rate seeding operations would be desirable. If a simple economical system was available, a significant improvement in operations could be made, with reduced occurrences of blockage from too little air flow, and seed damage and bounce from too much air flow.

SUMMARY OF THE INVENTION

It is an object of the present invention to provide for an air seeder a method and system of adjusting the air flow in an air stream in conventional and variable rate air seeding applications that is simple and economical. It is a further object of the present invention to provide such a method and system wherein the fan speed is adjusted to provide an air flow in the air stream that is appropriate for carrying the per minute rate of material being dispensed as that per minute rate varies, either with ground speed or as a result of a change in the per acre application rate.

It is a further object of the present invention to provide such a method and system wherein fan speeds that provide an appropriate air flow for varying material flow rates through a particular distribution network are empirically determined, and used in a microprocessor to adjust fan speeds as per minute dispensing rates vary. It is a further object of the present invention to provide such a method and system wherein a formula is derived from the tabulated fan speeds that will give the appropriate fan speed as a function of application rate and ground speed.

The present invention provides, in one aspect, a system for maintaining an appropriate air flow in an air stream in an air seeder. The system comprises a fan operative to provide an air flow to an air stream, wherein the air stream passes through a distribution network to carry agricultural materials for distribution across a width of a seeding implement. At least one tank contains a granular agricultural material and a metering device is operatively connected thereto that is operative to dispense agricultural material contained in the tank into the air stream. A rotational speed of the metering device is directly proportional to a ground speed of the air seeder such that a per acre application rate dispensed is substantially constant as the ground speed varies. A microprocessor is operatively connected to the air seeder such that the microprocessor receives signals indicating the rotational speed of the metering device and the ground speed. A fan control is operatively connected to the microprocessor and is operative to adjust a speed of the fan to vary the air flow in the air stream in response to signals from the microprocessor. The system is calibrated such that a known weight of agricultural material is dispensed into the air stream for each revolution of the metering device whereby the rotational speed of the metering device multiplied by the known weight per revolution results in a known per minute rate of agricultural material being dispensed into the air stream. The microprocessor is programmed to derive an appropriate fan speed for the per minute rate of agricultural material being dispensed into the air stream and send a signal to the fan control to adjust the speed of the fan to correspond to the appropriate fan speed.

In a second aspect the invention provides a method of maintaining an appropriate air flow in the air stream in an air seeding application wherein a fan provides an air flow in an air stream to carry agricultural material through a distribution network mounted on an air seeder comprising at least one tank containing a granular agricultural material and a metering device operative to dispense agricultural material contained in the tank into the air stream, wherein a rotational speed of the metering device is directly proportional to a ground speed of the air seeder such that a per acre application rate dispensed is substantially constant as the ground speed varies. The method comprises calibrating the system such that a known weight of agricultural material is dispensed into the air stream for each revolution of the metering device and a per revolution dispensing rate is determined, and then multiplying the per revolution dispensing rate by the rotational speed of the metering device to find a known per minute rate of agricultural material being dispensed into the air stream. An appropriate fan speed is determined for the per minute rate of agricultural material being dispensed into the air stream and the speed of the fan is adjusted to correspond to the appropriate fan speed.

Thus in air seeders of the invention, the fan speed is adjusted to provide an air flow in the air stream that is appropriate for carrying the per minute rate of material being dispensed as that per minute rate varies, either with ground speed or as a result of a change in the per acre application rate. While somewhat improved performance could be provided by simply linearly increasing the fan speed as the per minute rate of material being dispensed increased, it is preferred to determine fan speeds that more closely correspond to the actual fan speeds that are appropriate to carry the per minute rate of material being dispensed.

A preferred way to determine what the fan speed should be is to empirically determine by testing what the appropriate fan speed is for varying per minute rates of material being dispensed.

Each distribution network required for various configurations of the air seeder will have its own air flow requirements. The furrow opener spacing, implement width, and manifold configuration being used affect the determination of the required air flow and requisite fan speed. The air flow in any particular implement is also not as a rule, or necessarily, directly proportional to the fan speed. For example a 40 foot wide implement with 12 inch spacing of the furrow openers could have a distribution network comprising a 4 hole primary manifold and four 10 hole secondary manifolds, or a 5 hole primary manifold and five 8 hole secondary manifolds. The appropriate fan speed to provide an appropriate air flow to carry a given per minute rate of material being dispensed through each distribution network will be somewhat different.

To empirically find the requisite fan speed, each distribution network is set up on a test site with the fan connected. It is determined what range of per minute rates of material being dispensed will be carried through the distribution network, and the system is operated at incrementally changing per minute rates from one end of the range to the opposite end. An appropriate air flow is that air flow that is not excessive yet is sufficient to carry the material through the distribution network without plugging. The distribution network is preferably tilted as it would be in field conditions, and an appropriate air flow is determined.

Choosing the appropriate air flow is not a precision calculation, but rather is based on experience as to the terrain conditions that will be encountered, the character and mix of the agricultural materials that will likely be carried, atmospheric conditions, and so forth. When the appropriate air flow is achieved for an increment of dispensing rate, the fan speed that gives that air flow is noted. The process is repeated for each increment of dispensing rates. The fan will have a maximum speed, and a minimum speed will be selected below which the air flow is insufficient for carrying material through the distribution network.

From the tabulated per acre application rates and corresponding fan speeds, a formula is derived which determines the requisite fan speed as a function of the desired per acre application rate and the ground speed. With a known implement width, multiplying the ground speed by the per acre application rate will give a per minute rate of material being dispensed.

In operation at any given per acre application rate, the microprocessor will be reading the ground speed and applying the formula to adjust the fan speed if required by changes in ground speed.

In a variable rate air seeder, when a change in the per acre application rate is indicated to the microprocessor, either manually by an operator or from a GPS system, the microprocessor will (1) adjust the drive ratio so that the metering device dispenses the new desired per acre application rate, and (2) apply the formula with the new desired per acre application rate and current ground speed to find the new appropriate fan speed, and adjust the speed of the fan accordingly.

While the system and method of the invention are particularly suited to variable rate seeding applications, they are also useful in conventional seeding where per acre application rates are constant over a field. The system automatically varies the fan speed as ground speed varies, and when changing per acre application rates from field to field or from one crop to another the fan speed will be automatically adjusted to provide an appropriate air flow.

Extreme conditions can be addressed by providing a step-up and step-down over-ride control whereby the operator can manually increase or decrease the fan speed and thus the air flow, to a higher or lower proportion of the derived appropriate fan speed. In this way the operator can decrease the airflow when conditions warrant, such as when planting seeds that are very susceptible to damage, or increase the air flow when conditions are causing plugging. The system works the same, varying the fan speed as the ground speed and per acre application rate vary, but at a proportionally higher or lower speed.

Typically the appropriate fan speeds will be selected with a safety margin on the high end of an acceptable range to avoid plugging. Where damage susceptible seeds are planted, the operator might choose to reduce the fan speed by 10% to reduce seed damage. Similarly fan speed might be stepped down when working on flat terrain where the implement is level, and it is not required to move material at one end uphill, or stepped up when the terrain is very steep. Atmospheric conditions can be addressed in this manner as well.

The system is readily adapted to a double shoot air seeder with two fans, each supplying air flow to a separate distribution network, or the common single shoot case where seed and fertilizer are carried in and dispensed from two separate tanks into a single air stream that carries a mix of both through a single distribution network.

The system of the invention is much simpler and less costly than the system disclosed in Memory et al. which takes information in "real time", as it is happening, to control air flow such that the minimum air flow required to carry the material through the distribution network is provided.

The system of the present invention rather provides a more appropriate air flow than is provided in conventional air seeders, but does not attempt to provide the minimum air flow. A considerable improvement is provided over conventional air seeders in that the air flow is maintained at a level that is neither overly high or low, and provides satisfactory performance as the per minute rate of material being dispensed varies with the per acre application rate and ground speed.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
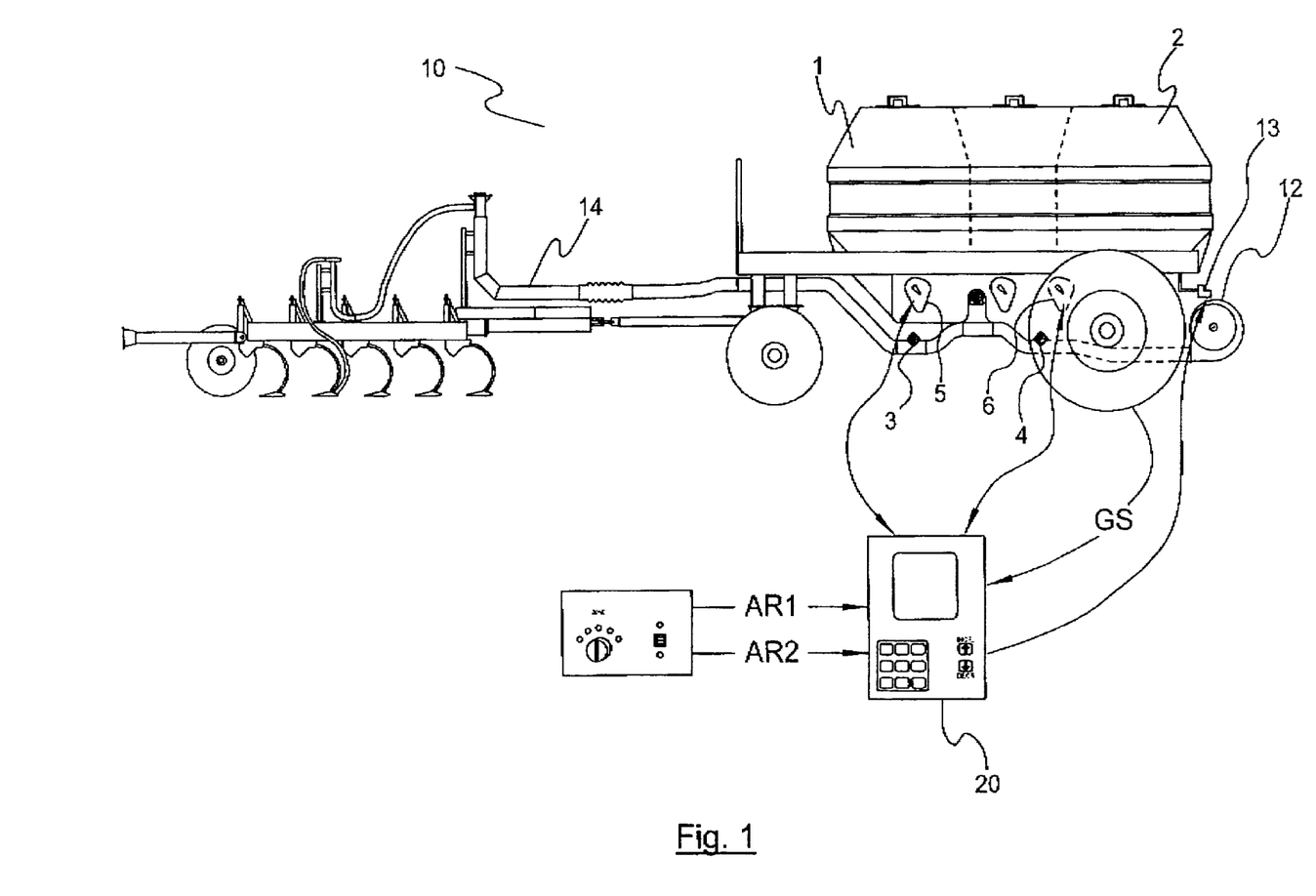
FIG. 1 is a schematic side view of an air seeder of the invention.

FIG. 1 illustrates an air seeder system 10 of the invention for use in a variable rate air seeding application. A fan 12 provides an air flow in an air stream to carry agricultural material from the tanks 1, 2 through a distribution network 14 mounted on the air seeder 10. Metering devices 3, 4 are operatively connected to the corresponding tanks 1, 2 and are operative to dispense agricultural material contained in the tanks 1, 2 into the air stream. The metering devices 3, 4 are rotated at a speed that is directly proportional to the ground speed of the air seeder such that a per acre application rate dispensed is substantially constant as the ground speed varies. The metering devices 3, 4 can be ground driven, or driven by a motor controlled to maintain the drive ratio between rotational speed of the metering devices 3, 4 and ground speed at the desired value.

A microprocessor 20 is operatively connected to the air seeder such that the microprocessor 20 receives signals indicating the rotational speed of the metering devices 3, 4 and the ground speed. The system is calibrated such that a known weight of agricultural material is dispensed into the air stream for each revolution of the metering devices 3, 4. When multiplied by the rotational speed of the metering device, the result is a known per minute rate of agricultural material being dispensed into the air stream. The fan speed must supply an appropriate air flow, neither insufficient nor excessive, to carry this per minute rate of material being dispensed through the distribution network 14, regardless of the ground speed or the per acre application rate. At the same time the per minute rate of material being dispensed is a function of the known implement width, which is constant, and the per acre application rate and ground speed which can vary.

It should be noted that in this description the phrases "per minute" rate of material being dispensed and "per acre" application rate are used to distinguish between a rate per unit of time, and a rate per unit of area. Of course any units could be used, and "acre" and "minute" were chosen only as convenient units to describe the operation of the invention.

Metering device controls 5, 6 are operative to adjust the drive ratio of the rotational speed of the metering devices 3, 4 to the ground speed thereby varying the per acre application rate of the corresponding metering devices 3, 4. The metering device controls 5, 6 will typically be a transmission or chain drive of some type where the metering devices 3, 4 are ground driven. In conventional seeders these are adjusted manually by changing drive sprockets or adjusting a transmission.

The metering device controls 5, 6 adjust the drive ratios such that for a given distance of travel, representing a field area, the metering devices 3, 4 each rotate the number of revolutions required to dispense the weight of material required on that field area to provide the desired per acre application rate.

In variable rate seeders as illustrated in FIG. 1, the metering device controls 5, 6 automatically adjust the drive ratio in response to instructions from the microprocessor 20. In variable rate seeders, the metering devices 3, 4 are sometimes driven by a motor rather than a ground drive, and the drive ratio will be adjusted directly by the microprocessor 20 controlling the speed of the motor.

The microprocessor 20 is programmed to receive instructions indicating the desired per acre application rate AR1, AR2 for the agricultural materials carried in each tank 1, 2, and to adjust the corresponding drive ratios with the metering device controls 5, 6 accordingly. The microprocessor 20 can be instructed to apply a desired per acre application rate by an operator based on observation of field position, or by a global positioning system and a programmed map of desired per acre application rates for different field positions as is known in the art.

The microprocessor 20 is also operatively connected to a fan control 13 that is operative to vary the speed of the fan 12, and thus vary the air flow in the air stream in response to instructions from the microprocessor 20. The microprocessor 20 is programmed to derive an appropriate fan speed for the per minute rate of agricultural material being dispensed into the air stream and send a signal to the fan control 13 to adjust the speed of the fan speed.

The system of the invention can be used to control fan speed in a variable rate air seeder as the per acre application rate varies within a field, or in a conventional air seeder as ground speed varies, and as the per acre application rate is changed from field to field or crop to crop.

The microprocessor thus is operative to receive information on the actual per acre application rates and the desired per acre application rates AR1 AR2 of agricultural material from each tank 1, 2 and the ground speed GS, and in response to this information to control the per acre application rate from each metering device 3, 4 and to control the speed of the fan 12.

In the illustrated embodiment of FIG. 1, the total per minute rate of material being dispensed and carried by the air stream will be the sum of the per minute rates of material being dispensed from each tank 1, 2. In alternate embodiments with a single tank, or three or more tanks, again the total per minute rate of material being dispensed into the air stream is the sum of the rates from each tank and must be determined in order to adjust the fan speed to that required to provide the appropriate air flow for that total.

The make up of the mix of agricultural materials carried in the air stream will affect the density of the mix, and will change depending on the agricultural materials being applied. Some agricultural materials are quite dense and are susceptible to falling out of the air stream while lighter materials remain in the air stream. The mix thus somewhat affects the appropriate air flow and fan speed, however it has been found that an average mix, based on experience, provides a satisfactory system.

Once the total per minute rate of material being dispensed is known, the appropriate fan speed necessary to provide the appropriate air flow to carry that total through the distribution network 14 must be determined. Generally a higher rate requires a higher air flow and therefore a higher fan speed, but the relationship between the rate and the fan speed required to provide an appropriate air flow is not direct. For a particular distribution network 14 such as would be found on an air seeder, the fan speed to provide an air flow appropriate for carrying a given material flow rate is preferably determined empirically.

To empirically find the requisite fan speeds, each different distribution network 14 is set up on a test site with the fan 12 connected. It is determined what range of per minute rates of material being dispensed will be carried through the distribution network 14 during field operations, and the system is operated at incrementally changing material flow rates from one end of the range to the opposite end, with due consideration given to maximum and minimum fan speeds.

Conveniently a complete air seeder can be tested in this manner. For example in a variable rate air seeder with ground driven metering devices, the ground drive wheel can be turned with an electric motor at a constant speed that corresponds to a typical operating ground speed. The drive ratio, being that ratio between the rotational speed of the metering devices and the ground speed, is varied incrementally by the variable rate mechanism of the air seeder to provide incrementally increasing per acre application rates. At a constant speed these correspond to incrementally increasing per minute rates of material being dispensed.

An appropriate air flow is that air flow that is not excessive yet is sufficient to carry the material through the distribution network 14 without plugging. The distribution network 14 is preferably tilted as it would be in field conditions, and an appropriate air flow is determined. Choosing the appropriate air flow is not a precision calculation, but rather is based on experience as to the terrain conditions that will be encountered, the character and mix of the agricultural materials that will likely be carried, atmospheric conditions, and so forth. When the appropriate air flow is achieved for an increment of per minute rate of material being dispensed, the fan speed that gives that air flow is noted. The process is repeated for each increment of per minute rates and the results tabulated.

The tabulated appropriate fan speeds for each increment could be programmed into the microprocessor 20. Then when the required per minute rate of material being dispensed and to be carried by the air stream is derived as above, the microprocessor 20 would determine in which increment the rate falls and the corresponding fan speed. This is a cumbersome process and provides incremental adjustments that require small increments to provide satisfactory operation.

For the purposes of the system, which is to provide an appropriate air flow that is closer to the ideal than is possible with conventional systems, but within a substantial tolerance from the ideal, an equation is found that approximates the table of per minute rates of material being dispensed and corresponding appropriate fan speeds.

The per acre application rate and ground speed, for a given width, determine the per minute rate of material being dispensed and are conveniently incorporated with the equation into a formula, as described below, that gives the appropriate fan speed as a function of ground speed and total per acre application rate. The formula smoothes out the incremental values, so that for any given ground speed and per acre application rate, there is a calculated appropriate fan speed.

In the illustrated embodiment of FIG. 1, the microprocessor 20 adds the two desired per acre application rates AR1, AR2 to find a total per acre application rate and then applies the formula to determine the appropriate fan speed.

In operation the air seeder will be moving along the field with the metering devices 3, 4 set to dispense desired per acre application rates AR1, AR2. The microprocessor 20 will apply the formula from time to time and adjust the fan speed if required due to a change in ground speed.

When the microprocessor 20 is instructed to change one of the desired per acre application rates AR1, AR2, the microprocessor 20 will apply the formula using the new desired per acre application rate, and then substantially simultaneously adjust the corresponding metering device 3, 4 to dispense the new desired per acre application rate into the air stream, and adjust the fan speed to correspond to the calculated appropriate fan speed.

By adjusting the fan speed and per acre application rate together, the proper relationship is substantially maintained during the adjustment period, with the values rising and falling together while the proper values are being achieved.

In variable rate seeding, both the per acre application rates and ground speed vary as the air seeder moves through the field, such that the microprocessor 20 is continuously receiving this information and calculating the appropriate fan speed and making required adjustments to fan speed and per acre application rates.

While the system and method of the invention are particularly suited to variable rate seeding, they are also useful in conventional seeding where the per acre application rates are constant over the field. The system automatically varies the fan speed as ground speed varies, and when changing per acre application rates from field to field or from one crop to another the fan speed will be automatically adjusted to provide an appropriate air flow.

Each distribution network 14 will have a particular configuration, including primary and secondary manifolds, furrow opener spacing, width of implement, and so forth.

Each can be tested to empirically determine the table of fan speeds and per minute rates of material being dispensed, or in some cases small variations in configuration may be known from experience and from tests on similar networks to produce insignificant variations in fan speed requirements.

Figure 2:
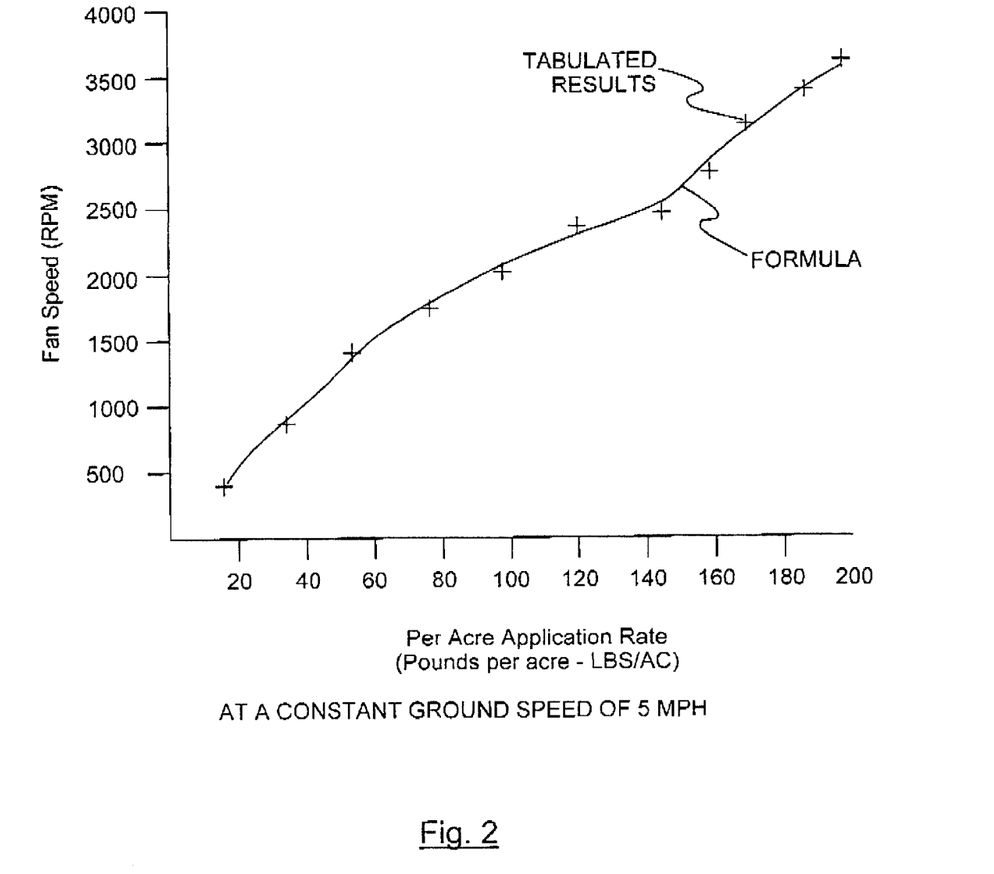
FIG. 2 is a table of empirically determined fan speeds that provide an air flow that is appropriate for carrying a corresponding per acre application rate at a constant ground speed; a formula derived from these empirical results is graphed on the table as well.

FIG. 2 illustrates such a table of empirically determined appropriate fan speeds for corresponding increments of per acre application rates at a constant speed, corresponding to per minute rates of material being dispensed. The graph also illustrates how an equation follows the tabulated findings within the tolerances required by the system. The deviation between the tabulated results and the formula results is within acceptable tolerances.

The derived formula for one particular 34 foot wide distribution network with 7 inch spacing is:

$$FS=0.836((6.93+1.69(GS-4))SR+1954)$$

where:

FS is the fan speed in revolutions per minute;

GS is the ground speed in miles per hour;

SR is the seeding rate in pounds per acre.

The derived formula for a 34 foot wide distribution network with 10 inch spacing is:

$$FS=1.0((6.47+1.55(GS-4))SR+1779)$$

It has further been found that a formula can be derived that is within acceptable tolerances for similarly configured distribution networks with a constant furrow opener spacing as the width of the distribution network varies.

The derived formula for a distribution network with 7 inch spacing is:

$$FS=K((6.93+1.69(GS-4))SR+1954)$$

were K is a constant that varies with the width of the distribution network as follows:

| Width in feet | K |
|---|---|
| 24–29 | 0.741 |
| 34 | 0.836 (as in example above) |
| 38–42 | 1.0 |
| 52 | 1.017 |
| 64 | 1.106 |

Similarly the derived formula for a distribution network with 10 inch spacing is:

$$FS=K((6.47+1.55(GS-4))SR+1779)$$

where K is a constant that varies with the width of the distribution network as follows:

| Width in feet | K |
|---|---|
| 24–29 | 0.926 |
| 34–42 | 1.0 (as in example above) |
| 50–52 | 1.203 |
| 54 | 1.165 |
| 64 | 1.222 |

The formula is particular to the configuration of the distribution network, and is determined empirically from test data. The variables in the formula are the seeding rate and the ground speed which multiplied together give a per minute rate of material being dispensed that must be carried by the air stream, and the formula allows calculation of the appropriate fan speed.

The air seeder 10 of FIG. 1 illustrates a typical "single shoot" system where agricultural materials from the tanks 1, 2 is mixed and carried in a single air stream through a single distribution network 14 to a furrow created by the air seeder 10.

Figure 3:
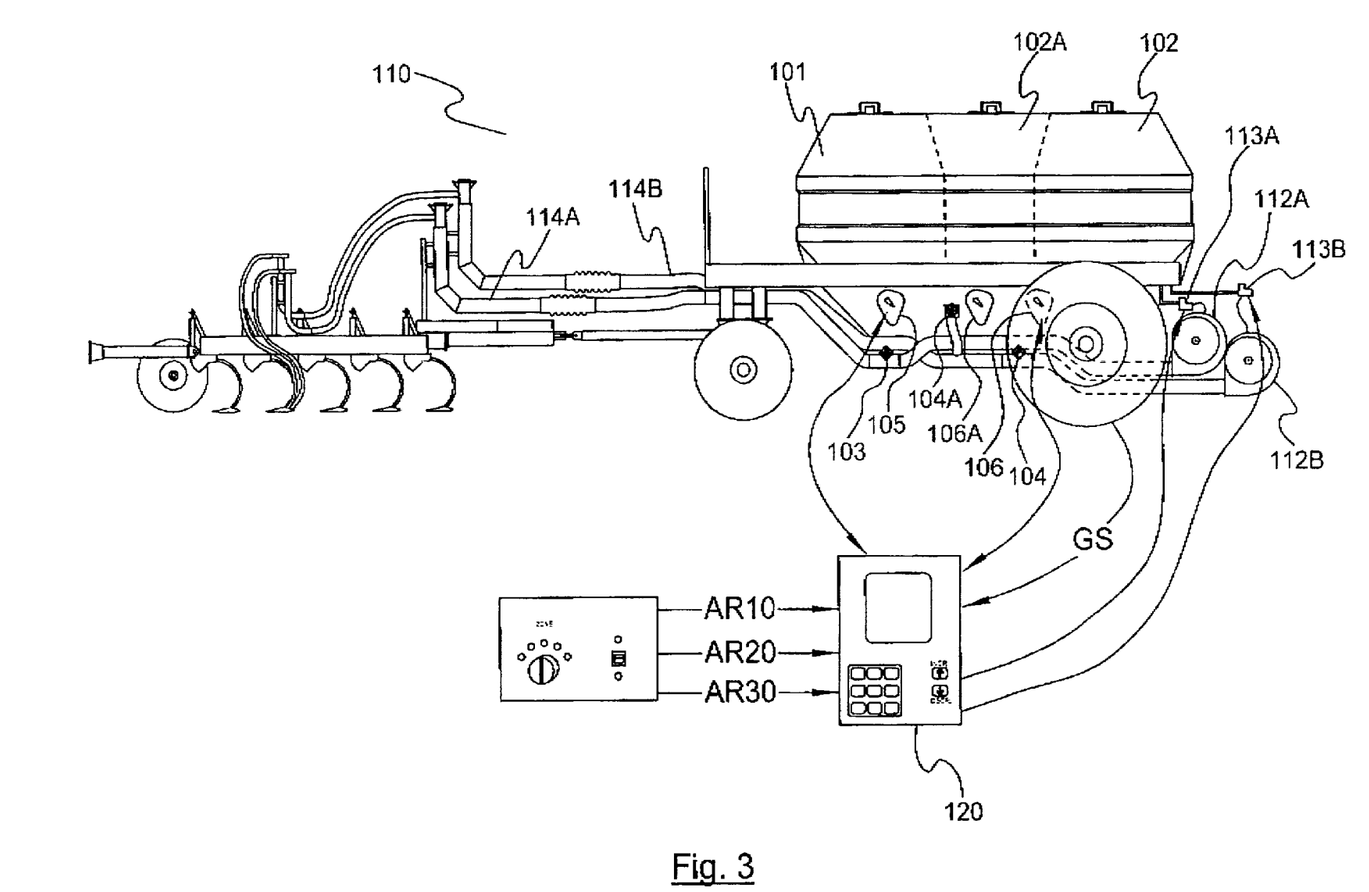
FIG. 3 is a schematic side view of an alternate double shoot air seeder of the invention.

FIG. 3 illustrates a "double shoot" air seeder 110 wherein a first fan 112A is operative to provide a first air flow to a first air stream passing through a first distribution network 114A to carry agricultural materials for distribution across a width of the air seeder 110, and a second fan 112B is operative to provide a second air flow to a second air stream passing through a second distribution network 114B to carry agricultural materials for distribution across a width of the air seeder 110. The agricultural materials are typically fertilizer and seed. The seed is typically deposited in one furrow and the fertilizer is deposited in a closely adjacent second furrow. FIG. 3 illustrates the common example where one tank dispenses a fertilizer blend into a first air stream for placement in a first furrow, and two other tanks 102, 102A dispense a mix of seed and fertilizer into a second air stream for placement in a second adjacent furrow.

Again first and second fan controls 113A, 113B are operatively connected to the microprocessor and operative to vary a speed of the first and second fans 112A, 112B to vary the air flows in the first and second air streams in response to signals from the microprocessor 120.

First metering device 103, is operative to dispense agricultural materials from first tank 101, into the first air stream. Second and third metering devices 104, 104A are operative to dispense agricultural materials from second and third tanks 102, 102A into the second air stream. First, second and third metering device controls 105, 106, 106A are operative to vary the drive ratios and the per acre application rates of the metering devices 103, 104, 104A in response to instructions from the microprocessor 120.

The microprocessor 120 is programmed to receive instructions indicating a first desired per acre application rates AR10 to be carried by the first air stream, and to determine as above the appropriate fan speed for the first fan 112A for carrying the first desired per acre application rates at the sensed ground speed.

The microprocessor 120 is also programmed to receive instructions indicating second and third desired per acre application rates AR20, AR30 to be carried by the second air stream, and to determine the appropriate fan speed for the second fan 112B for carrying the total of the second and third desired per acre application rates at the sensed ground speed When a change in one of the desired per acre application rates is called for, the microprocessor 120 substantially simultaneously operates the corresponding metering device control 105, 106, 106A to dispense the desired per acre application rate into the corresponding air stream, and applies the relevant formula to find the appropriate fan speed for the per acre application rates and sensed ground speed, and operates the corresponding fan speed controls 113A, 113B to adjust the speed of the fan to correspond to the calculated appropriate fan speed.

In a similar manner the system can be adapted to various combinations of tanks and air streams.

Figure 4:
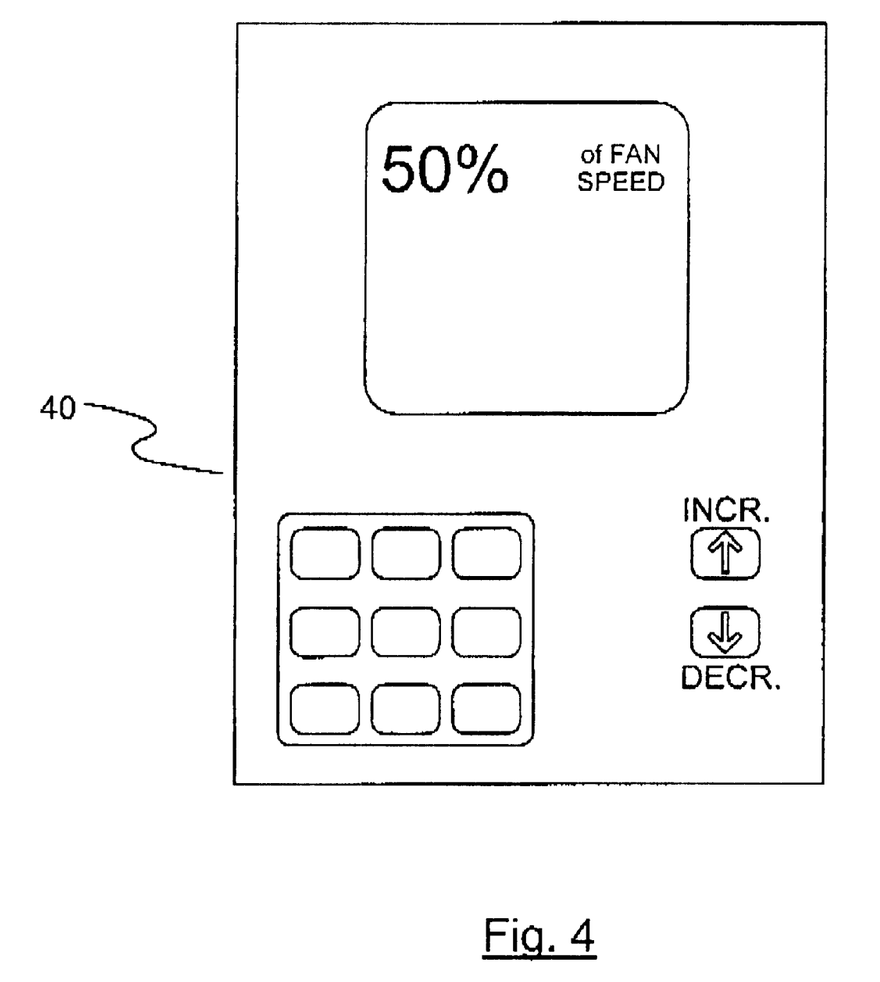
FIG. 4 is a front view of an over-ride control.

As seen in FIG. 4, a step-up and step-down over-ride control 40 is provided that is operative to selectively increase or decrease the fan speed to a selected proportion of the appropriate fan speed. Typically the selected proportion is between 50% and 200% of the calculated appropriate fan speed and is visually indicated to an operator.

The over-ride control 40 will be very advantageous and will be provided in the majority of systems. Extreme conditions can be addressed by such a control which allows the operator to manually increase or decrease the fan speed and thus the air flow, to a higher or lower proportion of the requisite fan speed. In this way the operator can decrease the airflow when conditions warrant, such as when planting seeds that are very susceptible to damage, or increase the air flow when atmospheric conditions are causing plugging. The system works the same, varying the fan speed as the ground speed and per acre application rate vary, but at a proportionally higher or lower speed. Typically the fan speed will be set with a safety margin on the high end of an acceptable range to avoid plugging. Where damage susceptible seeds are planted, the operator might choose to reduce the fan speed by 10% or 20% to reduce seed damage. Similarly fan speed might be stepped down when working on flat terrain where the implement is level, and it is not required to move material at one end uphill, or stepped up when the terrain is very steep. Atmospheric conditions can be addressed in this manner as well.

Figure 5:
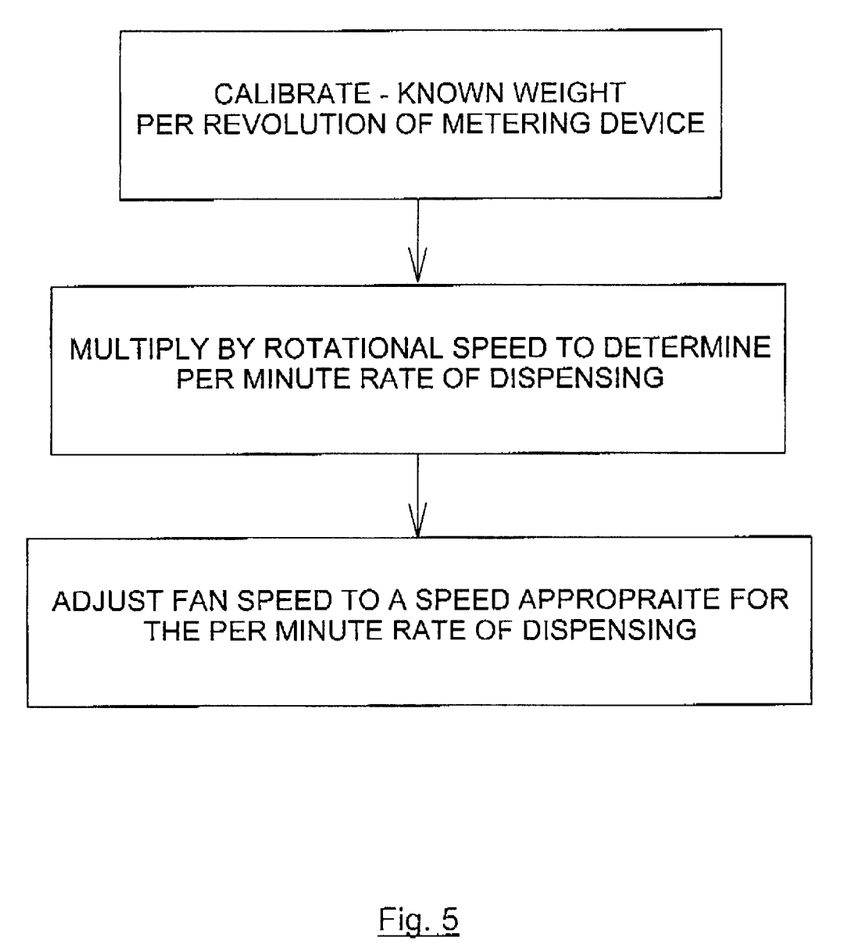
FIG. 5 is a diagram setting out the steps in a method of the invention.

FIG. 5 illustrates a method of the invention comprising calibrating the system such that a known weight of agricultural material is dispensed into the air stream for each revolution of the metering device. This per revolution dispensing rate is multiplied by the rotational speed of the metering device to find a known per minute rate of agricultural material being dispensed into the air stream. An appropriate fan speed for the per minute rate of agricultural material being dispensed into the air stream is determined and the speed of the fan is adjusted to correspond to the appropriate fan speed.

The appropriate fan speed can be determined by applying a formula wherein the appropriate fan speed is a function of ground speed and a desired per acre application rate. The formula is preferably determined by empirically determining and tabulating the appropriate fan speed for each of a plurality of incrementally varying per minute rates of agricultural materials being dispensed and carried through the distribution network, and then finding an equation that follows the tabulated values within acceptable tolerances. The formula incorporates the determination of the per minute rate of material being dispensed from the per acre application rate and ground speed, such that a separate calculation is not required.

In operation a desired per acre application rate is chosen, the current ground speed is determined, and the formula is applied to find the appropriate fan speed for the desired per acre application rate and determnined ground speed. The drive ratio of the rotational speed of the metering device to the ground speed of the air seeder is adjusted such that the desired per acre application rate is dispensed, and the speed of the fan is substantially simultaneously adjusted to correspond to the appropriate fan speed. As either the per acre application rate or the ground speed vary, the fan speed will be adjusted to provide an appropriate air flow.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. an air seeder, a system for maintaining an appropriate air flow in an air stream, the system comprising:
    a fan operative to provide an air flow to an air stream, wherein the air stream passes through a distribution network to carry agricultural materials for distribution across a width of a seeding implement;
    at least one tank containing a granular agricultural material;
    a metering device operatively connected to the at least one tank and operative to dispense agricultural material contained in the tank into the air stream;
    wherein a rotational speed of the metering device is directly proportional to a ground speed of the air seeder such that a per acre application rate dispensed is substantially constant as the ground speed varies,
    a microprocessor operatively connected to the air seeder such that the microprocessor receives signals indicating the rotational speed of the metering device and the ground speed;
    a fan control operatively connected to the microprocessor and operative to adjust a speed of the fan to vary the air flow in the air stream in response to signals from the microprocessor;
    wherein the system is calibrated such that a known weight of agricultural material is dispensed into the air stream for each revolution of the metering device whereby the rotational speed of the metering device multiplied by the known weight per revolution results in a known per minute rate of agricultural material being dispensed into the air stream; and
    wherein the microprocessor is programmed to derive an appropriate fan speed for the per minute rate of agricultural material being dispensed into the air stream and send a signal to the fan control to adjust the speed of the fan to correspond to the appropriate fan speed.

2. The system of claim 1 further comprising a metering device control operative to adjust a drive ratio of the rotational speed of the metering device to the ground speed thereby varying the per acre application rate.

3. The system of claim 2 wherein the metering device control is operatively connected to the microprocessor, and wherein the microprocessor is programmed to send signals to the metering device control to adjust the drive ratio.

4. The system of claim 3 wherein the microprocessor is programmed to receive input indicating a desired per acre application rate and to send signals to the metering device control to adjust the drive ratio so that the desired per acre application rate is dispensed.

5. The system of claim 4 wherein the microprocessor applies a formula wherein the appropriate fan speed is a function of the ground speed and the desired per acre application rate.

6. The system of claim 5 wherein the formula is determined by empirically determining and tabulating the appropriate fan speed for each of a plurality of incrementally varying per minute rates of agricultural materials being dispensed and carried through the distribution network, and then finding an equation that follows the tabulated values within acceptable tolerances.

7. The system of claim 5 wherein the desired per acre application rate changes as the air seeder moves along a field.

8. The system of claim 7 wherein the microprocessor is instructed to apply the desired per acre application rate by an operator based on observation of field position.

9. The system of claim 7 wherein the microprocessor is instructed to apply the desired per acre application rate by a global positioning system and a programmed map of desired per acre application rates for different field positions.

10. The system of claim 1 further comprising providing an over-ride control operative to selectively increase or decrease the fan speed to a selected proportion of the appropriate fan speed.

11. The system of claim 10 wherein the selected proportion is between 50% and 200%.

12. The system of claim 11 wherein the selected proportion is visually indicated to an operator.

13. The system of claim 1 comprising
first and second tanks, each containing granular agricultural material;
first and second metering devices operatively connected to the respective first and second tanks and operative to dispense the agricultural material contained in the tanks into the air stream;
a microprocessor operatively connected to the first and second metering devices such that the microprocessor receives signals from each metering device indicating the rotational speed of each metering device;
wherein the system is calibrated such that for each metering device a known weight of agricultural material is dispensed into the air stream for each revolution whereby the rotational speed of a metering device multiplied by the known weight per revolution for that metering device results in a known per minute rate of agricultural material being dispensed into the air stream by that metering device; and
wherein the microprocessor is programmed to derive an appropriate fan speed for the total per minute rate of agricultural material being dispensed into the air stream by both metering devices and send a signal to the fan control to adjust the speed of the fan to correspond to the appropriate fan speed.

14. The system of claim 1 wherein the system comprises:
a first fan operative to provide a first air flow to a first air stream, wherein the first air stream passes through a first distribution network to carry agricultural materials for distribution across a width of a seeding implement;
a second fan operative to provide a second air flow to a second air stream, wherein the second air stream passes through a second distribution network to carry agricultural materials for distribution across a width of the seeding implement;
a first fan control operatively connected to the microprocessor and operative to vary a speed of the first fan in response to signals from the microprocessor;
a second fan control operatively connected to the microprocessor and operative to vary a speed of the second fan in response to signals from the microprocessor;
a first metering device operative to dispense agricultural materials from a first tank into the first air stream, and a second metering device operative to dispense agricultural materials from a second tank into the second air stream;
wherein the microprocessor is operatively connected to receive signals indicating the ground speed of the air seeder, and operatively connected to each metering device to receive signals from each metering device indicating the rotational speed of each metering device;
wherein the system is calibrated such that for each metering device a known weight of agricultural material is dispensed into the air stream for each revolution whereby the rotational speed of a metering device multiplied by the known weight per revolution for that metering device results in a known per minute rate of agricultural material being dispensed into the air stream by that metering device; and
wherein the microprocessor is programmed to derive an appropriate first fan speed for the per minute rate of agricultural material being dispensed into the first air stream by the first metering device and to derive an appropriate second fan speed for the per minute rate of agricultural material being dispensed into the second air stream by the second metering device and adjusts the speed of the first and second fans to correspond with the appropriate first and second fan speeds.

15. The system of claim 14 wherein the system comprises:
a third metering device operative to dispense agricultural materials from a third tank into the second air stream;
wherein the microprocessor is operatively connected to the third metering device such that the microprocessor receives signals from the third metering device indicating the rotational speed of the third metering device;
wherein the system is calibrated such that for each metering device a known weight of agricultural material is dispensed into the air stream for each revolution whereby the rotational speed of a metering device multiplied by the known weight per revolution for that metering device results in a known per minute rate of agricultural material being dispensed into the air stream by that metering device; and wherein the system is calibrated such that a known weight of agricultural material is dispensed into the second air stream for each revolution of the third metering device whereby the rotational speed of the third metering device multiplied by the known weight per revolution for the third metering device results in a known per minute rate of agricultural material being dispensed by the third metering device;
wherein the microprocessor is programmed to derive an appropriate second fan speed for the total per minute rate of agricultural material being dispensed into the second air stream by the second and third metering devices and send a signal to the second fan control to adjust the speed of the second fan to correspond to the appropriate second fan speed.

16. In an air seeding application wherein a fan provides an air flow in an air stream to carry agricultural material through a distribution network mounted on an air seeder comprising at least one tank containing a granular agricultural material and a metering device operatively connected to the at least one tank and operative to dispense agricultural material contained in the tank into the air stream, wherein a rotational speed of the metering device is directly proportional to a ground speed of the air seeder such that a per acre application rate dispensed is substantially constant as the ground speed varies, a method of maintaining an appropriate air flow in the air stream comprising:
calibrating the system such that a known weight of agricultural material is dispensed into the air stream for each revolution of the metering device and a per revolution dispensing rate is determined;
multiplying the per revolution dispensing rate by the rotational speed of the metering device to find a known per minute rate of agricultural material being dispensed into the air stream; and determining an appropriate fan speed for the per minute rate of agricultural material being dispensed into the air stream and adjusting the speed of the fan to correspond to the appropriate fan speed.

17. The method of claim 16 wherein the appropriate fan speed is determined by applying a formula wherein the appropriate fan speed is a function of ground speed and a desired per acre application rate.

18. The method of claim 17 wherein the formula is determined by empirically determining and tabulating the appropriate fan speed for each of a plurality of incrementally varying per minute rates of agricultural materials being dispensed and carried through the distribution network, and then finding an equation that follows the tabulated values within acceptable tolerances.

19. The method of claim 17 further comprising:

choosing a desired per acre application rate;

determining a current ground speed;

applying the formula to find the appropriate fan speed for the desired per acre application rate and determined ground speed; and adjusting a drive ratio of the rotational speed of the metering device to the ground speed of the air seeder such that the desired per acre application rate is dispensed, and adjusting the speed of the fan to correspond to the appropriate fan speed.

20. The method of claim 19 wherein the drive ratio and fan speed are adjusted substantially simultaneously.

* * * * *